United States Patent
Desbiolles et al.

(10) Patent No.: US 7,797,127 B2
(45) Date of Patent: Sep. 14, 2010

(54) METHOD FOR DETERMINING TWO PSEUDO-SINUSOIDAL SIGNALS IN QUADRATURE

(75) Inventors: Pascal Desbiolles, Thorens Glieres (FR); Christophe Duret, Quintal (FR)

(73) Assignee: SNR Roulements, Annecy (FR)

( * ) Notice: Subject to any disclaimer, the term of this patent is extended or adjusted under 35 U.S.C. 154(b) by 198 days.

(21) Appl. No.: 11/880,309

(22) Filed: Jul. 20, 2007

(65) Prior Publication Data
US 2008/0027672 A1    Jan. 31, 2008

(30) Foreign Application Priority Data
Jul. 27, 2006   (FR)  .................................. 06 06909

(51) Int. Cl.
*G06F 15/00* (2006.01)
(52) U.S. Cl. .................. 702/163; 702/145; 702/151; 250/231.18; 250/231.13; 250/231.14; 341/11; 341/3; 324/207.25; 324/160; 324/165
(58) Field of Classification Search ................ 702/145, 702/151, 163; 250/231.18, 231.13, 231.14; 341/11, 3; 73/1.75, 1.79; 324/207.25, 160, 324/165
See application file for complete search history.

(56) References Cited

U.S. PATENT DOCUMENTS

| | | | | |
|---|---|---|---|---|
| 5,523,681 A | * | 6/1996 | Hajzler et al. ............... | 324/174 |
| 5,594,334 A | * | 1/1997 | Sonnerat et al. ............. | 324/173 |
| 5,611,545 A | * | 3/1997 | Nicot .......................... | 277/402 |
| 6,700,367 B1 | * | 3/2004 | Santos et al. ................. | 324/165 |
| 7,166,996 B2 | * | 1/2007 | Godkin .................... | 324/207.24 |
| 7,244,929 B2 | * | 7/2007 | Rodi ...................... | 250/231.18 |
| 7,250,754 B2 | * | 7/2007 | Godkin .................. | 324/207.24 |
| 2004/0239311 A1 | * | 12/2004 | Santos et al. ................. | 324/165 |
| 2006/0060764 A1 | * | 3/2006 | Rodi ....................... | 250/231.13 |
| 2008/0036454 A1 | * | 2/2008 | Landrieve .............. | 324/207.25 |
| 2008/0272770 A1 | * | 11/2008 | Duret et al. ............ | 324/207.25 |

FOREIGN PATENT DOCUMENTS

FR    2792403    10/2000

\* cited by examiner

*Primary Examiner*—Carol S Tsai
(74) *Attorney, Agent, or Firm*—Bachman & LaPointe, P.C.

(57) ABSTRACT

A method for determining two pseudo-sinusoidal signals in quadrature from a pseudo-sinusoidal signal transmitted by an encoder is provided. The method using a sensor arranged within reading distance of the encoder, which sensor includes at least four sensing elements which are linearly equally distributed. The sensing elements are each capable of delivering a signal $S_i$ representative of the signal transmitted by the encoder. The method measuring the signals $S_i$ and combining the signals $S_i$ in order to form the signals $U=(S_1-S_2)-(S_3-S_4)$ and $V=(S_2-S_3)$, which signals U and V are in quadrature. A system for determining by implementing such a method, as well as a bearing including such a determination system, are provided.

4 Claims, 2 Drawing Sheets

METHOD FOR DETERMINING TWO PSEUDO-SINUSOIDAL SIGNALS IN QUADRATURE

BACKGROUND (1) Field of the Invention

The invention relates to a method for determining two pseudo-sinusoidal signals in quadrature from a pseudo-sinusoidal signal transmitted by an encoder, a system for determining by implementing such a method, as well as a bearing including such a determination system.

The invention applies in particular to the field of determining angular data, such as the position or the speed of a rotating member in relation to a stationary member.

(2) Prior Art

As a matter of fact, in an application such as this, it is necessary to be able to make advantageous use of two pseudo-sinusoidal signals in quadrature, which are representative of the angular position of the rotating member in relation to the stationary member.

In order to do so, it is known from the document FR-A1-2 792 403, to use an encoder capable of transmitting a pseudo-sinusoidal signal, and a sensor including at least four sensing elements which are linearly equally distributed, said sensing elements each being capable of delivering a signal $S_i$ representative of the signal transmitted by the encoder. In order to form the two signals in quadrature, this document anticipates combining the signals $S_i$ in order to form the signals $$U=(S_1-S_2)-(S_3-S_4) \text{ and } V=(S_1+S_2)-(S_3+S_4).$$

When it is implemented with a multipole encoder delivering a magnetic signal, this embodiment has numerous advantages in that it makes it possible:

- to preserve the signals U and V in quadrature for several pole lengths of the encoder;
- to obtain signals U and V of the same amplitude, for a given pole length, by adjusting the conditioning gains corresponding to the amplification of the signals U or V;
- to eliminate the magnetic offsets.

On the other hand, under certain particular operating conditions, this embodiment can introduce certain limitations with respect to the positioning of the sensing elements in relation to the encoder.

For example, the equality of the amplitudes of the signals U and V can be affected by:

- a misalignment of the encoder in relation to its axis of rotation, which is the reason why the sensing elements detect poles of variable pole lengths in one revolution;
- the presence of poles of different length on the encoder, whether this presence is due to a magnetization defect or to a desired configuration;
- the application of a gain which is not perfectly suited to the pole length of the encoder.

Furthermore, the quadrature of the signals U and V can be affected when the straight line passing through all of the sensing elements is not perfectly parallel to the plane of the encoder (tilt of the sensor) This phenomenon is all the more critical the more the amplitude of the magnetic field varies exponentially in relation to the distance between the encoder and the sensing element.

Finally, in the case where the sensing elements are not arranged along the tangent to the reading beam (twist of the sensor), the two phenomena described above are combined, namely:

- the pole length seen by each of the sensing elements is different;
- the amplitude of the magnetic field read by the sensing elements is not the same, because of the edge effects on the signal delivered.

SUMMARY OF THE INVENTION

The purpose of the invention is to mitigate these disadvantages, in particular by proposing a conditioning of the signals coming from the sensing elements which, in relation to the quadrature and to the equality of amplitudes, introduces a more significant delivered signal reliability in response to both the positioning of the sensing elements in relation to the encoder, and to potential production defects in the encoder.

To that end, and according to a first aspect, the invention proposes a method for determining two pseudo-sinusoidal signals in quadrature from a pseudo-sinusoidal signal transmitted by an encoder, said method using a sensor arranged within reading distance of said encoder, said sensor including at least four sensing elements which are linearly equally distributed, said sensing elements each being capable of delivering a signal $S_i$ representative of the signal transmitted by the encoder, said method anticipating to measure the signals $S_i$ and to combine said signals $S_i$ in order to form the signals $U=(S_1-S_2)-(S_3-S_4)$ and $V=(S_2-S_3)$, said signals U and V being in quadrature.

According to a second aspect, by implementing such a method, the invention proposes a system for determining two pseudo-sinusoidal signals in quadrature from a pseudo-sinusoidal signal, said system including an encoder capable of transmitting the signal and a sensor including at least four sensing elements which are linearly equally distributed, said sensing elements each being capable of delivering a signal $S_i$ representative of the signal transmitted by the encoder, said system further including a processing device which is capable of forming the signals $S_i$ and of combining said signals $S_i$ in order to form the signals U and V.

According to a third aspect, the invention proposes a bearing equipped with such a determination system, said bearing including a stationary member and a rotating member, in which the encoder is interconnected with the rotating member and the sensor is interconnected with the stationary member, whereby the sensing elements are arranged within reading distance of the signal transmitted by the encoder.

BRIEF DESCRIPTION OF THE DRAWINGS

Other characteristics and advantages of the invention will become more apparent in the following description, made with reference to the attached figures, in which.

DETAILED DESCRIPTION OF THE PREFERRED EMBODIMENT(S)

Figure 1:
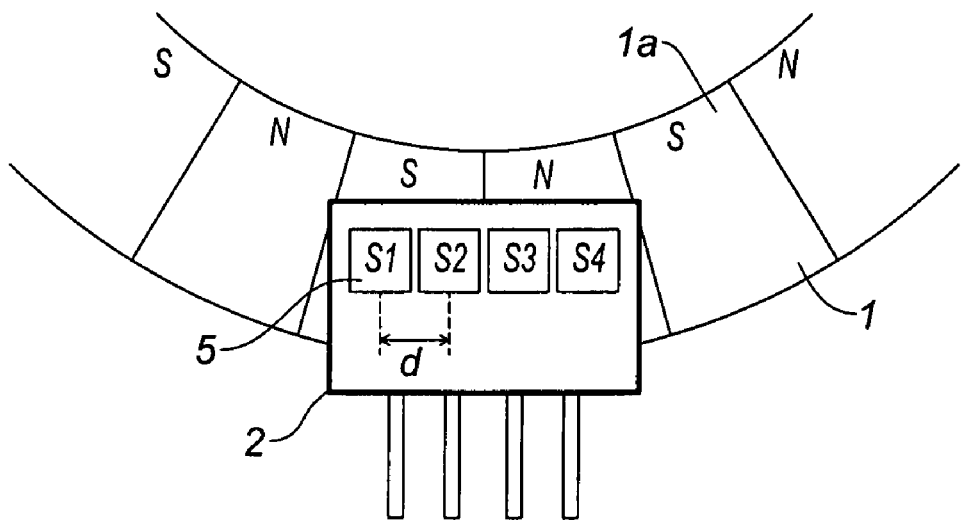
FIG. 1 is a top view of a partial representation of the encoder and the sensor of a determination system according to one embodiment of the invention.
Figure 2:
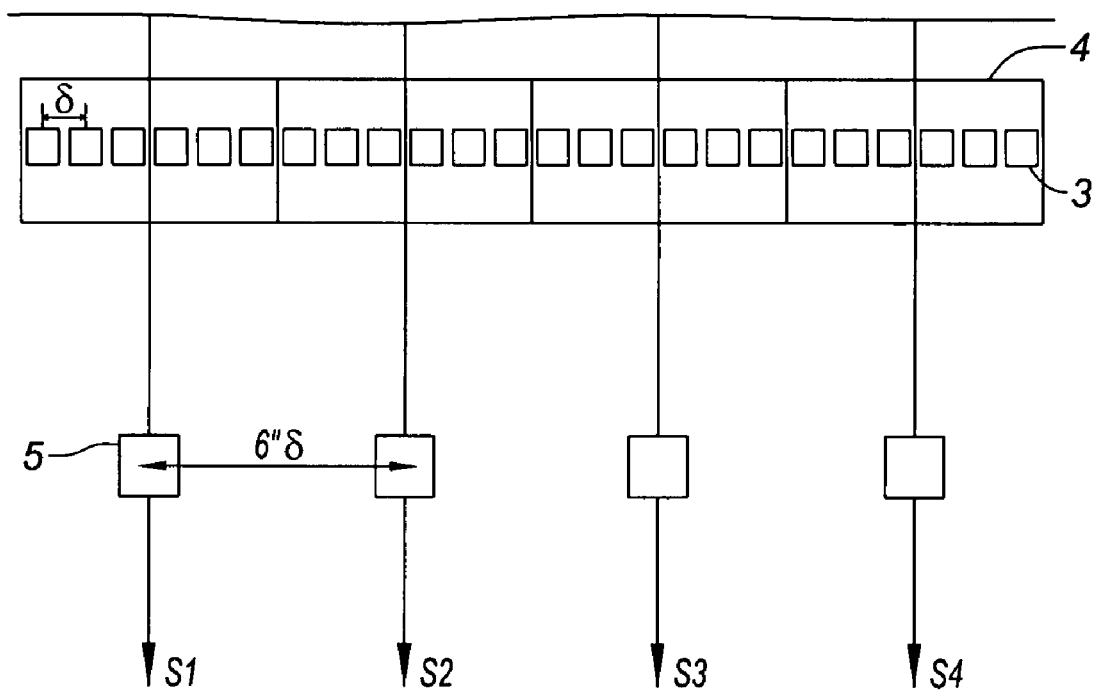
FIG. 2 is a schematic representation of the arrangement of the sensing elements in the sensor of FIG. 1.

An embodiment is described, in connection with FIGS. 1 and 2, for a system for determining two pseudo-sinusoidal signals in quadrature from a pseudo-sinusoidal signal transmitted by an encoder, as well as the method used in such a system.

In the description, a pseudo-sinusoidal signal is understood to mean any signal which is sinusoidal by nature or at least a portion of which can be correctly approximated by a sine curve.

In particular, the system and the method according to the invention enable determination of angular data, such as the position or the speed of a rotating member in relation to a stationary member.

The determination system includes an encoder 1 capable of transmitting the sinusoidal signal and a sensor 2 arranged within reading distance of the encoder 1. Thus, as will be seen in the remainder of the description, by providing for the encoder 1 to be integral with the movable member and for the sensor 2 to be integral with the stationary member, the pseudo-sinusoidal signal delivered by the encoder 1 is representative of the desired angular data.

In the embodiment shown, the encoder 1 is magnetic and includes a ring equipped with an alternating succession of North and South magnetic poles 1a of constant pole length. In a known manner, this type of encoder 1 is capable of transmitting a magnetic pseudo-sinusoidal signal in response to the movement of the encoder 1. However, other types of encoders and/or pseudo-sinusoidal signals fall within the scope of the invention, whether they are of an optical, thermal or acoustic nature, for example.

The sensor 2 includes at least four sensing elements 3 which are linearly equally distributed, said sensing elements each being capable of delivering a signal $S_i$ (i=1 to 4) representative of the signal transmitted by the encoder 1 at four equidistant virtual points. The means forming the sensor 2, as well as possibly the signal-processing devices, can be integrated on a substrate so as to form a custom application-specific integrated circuit (ASIC).

In exemplary embodiments, the sensing elements 3 are chosen from the group including Hall effect sensors, magnetoresistors, thermistors, optical probes and acoustic probes.

The determination system further includes a processing device which is capable of forming the signals $S_i$ and of combining the signals $S_i$ in order to form the signals:

$$U=(S_1 S_2)-(S_3 S_4) \text{ and } V=(S_2 S_3)$$

The signals U and V are in quadrature regardless of the pole length of the encoder. Thus, for a wide range of pole lengths, it is possible to exploit the signals U and V in a known manner, in order to determine the position or the speed of the encoder 1 in relation to the sensor 2. Furthermore, the signals U and V can be used to measure the amplitude of the pseudo-sinusoidal signal transmitted by the encoder 1, since the amplitudes of the signals U and V are proportional to that of the transmitted signal.

Furthermore, as the signals U and V are obtained by subtraction, they are devoid of any magnetic offset.

In the embodiment according to FIGS. 1 and 2, the sensor 2 includes 4N (N=6) sensing elements 3, which are equally distributed and aligned so as to form an array of 24 sensing elements separated from one another by a constant distance δ (see FIG. 2). As indicated in the document FR-A1-2 792 403, the use of an array of sensing elements 3 makes it possible to preserve the signals U and V in quadrature for several pole lengths of the encoder 1. Alternatively, four groups comprising a different number of sensing elements 3 could be used in order to obtain the signals U and V.

In order to carry out the determination operation, four groups 4 of six adjacent sensing elements 3 are used to calculate the sum of the signals of each group 4, in order to form four signals $S_i$ corresponding to each of the groups. To that end, the processing device includes means for calculating the sum of the signals delivered by each group 4, so as to form the signals $S_i$.

In the figures, a group 4 of sensing elements is diagrammed by an element 5 positioned at the barycentre of the group 4, the elements 5 being aligned and equally spread apart by a distance 6δ=d.

Furthermore, the array is arranged opposite the encoder 1 whereby the sensing elements 3 run substantially along a tangent to the reading beam. However, in the case of a slight misalignment of the array in relation to said tangent, the amplitude and the quadrature of the signals U and V are affected by it less significantly than in the prior art.

In addition, as concerns the respective amplitudes of the signals U and V, it is possible to anticipate amplification of at least one of these signals in order to equalise them. To that end, the processing device further includes means for amplifying the signals U and/or V.

In the specific case where the distance d is equal to one quarter of the spatial period of the pseudo-sinusoidal signal being measured, i.e., half the pole length in the case of the encoder 1 according to the embodiment shown, the signals U and 2V have the same amplitude. In the case where such equality is necessary for subsequent use of the signals formed, the determination method thus anticipates amplifying the signal V by a factor of 2. In order to do so, the gain of an amplifier of the processing device can be adjusted to this value.

If the distance d is any distance, then the signals U and V can be amplitude-equalised by multiplying by at least one gain adjusted for this purpose.

Figure 3:
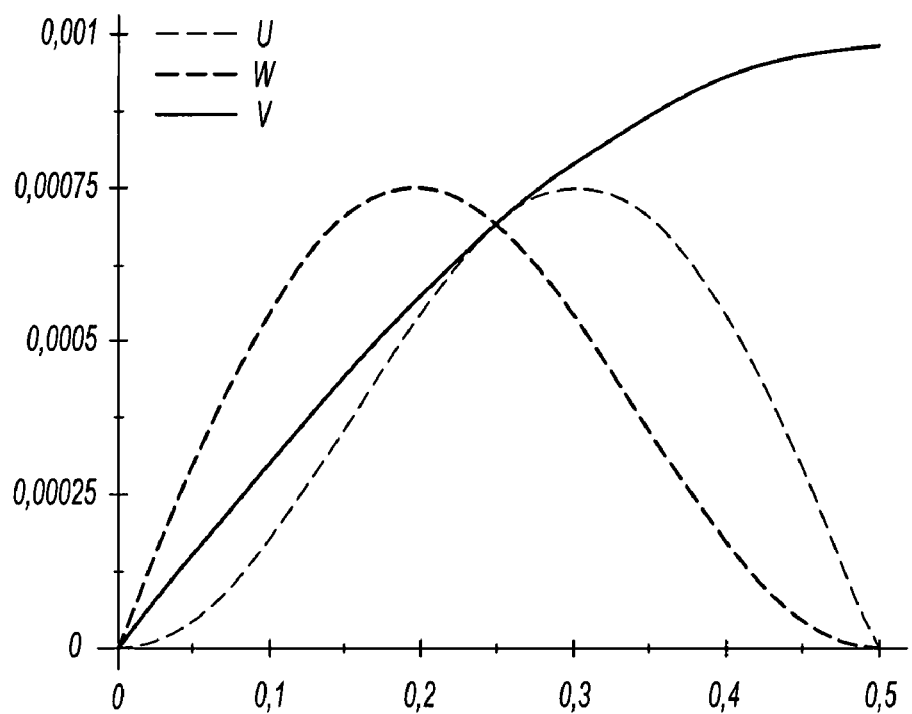
FIG. 3 shows the transfer function for the signals U and V, according to the invention, in relation to the signals U and W, according to the prior art.

FIG. 3 shows that, on either side of the optimal working point (abscissa 0.25=d/magnetic period), the signals U and V, according to the invention, are tangents, whereas the signals U and $W=(S_1+S_2)-(S_3+S_4)$, according to the prior art, clearly intersect. Consequently, in case of operating in a state far from the optimal point, e.g., in the case of misalignment of the encoder 1, the amplitudes of the signals according to the invention will remain similar, whereas, according to the prior art, they will quickly diverge.

In the same way, in the case of the tilt of the sensor 2, the signals U and V, according to the invention, are much more sensitive with respect to a loss of quadrature than the signals according to the prior art.

Figure 4:
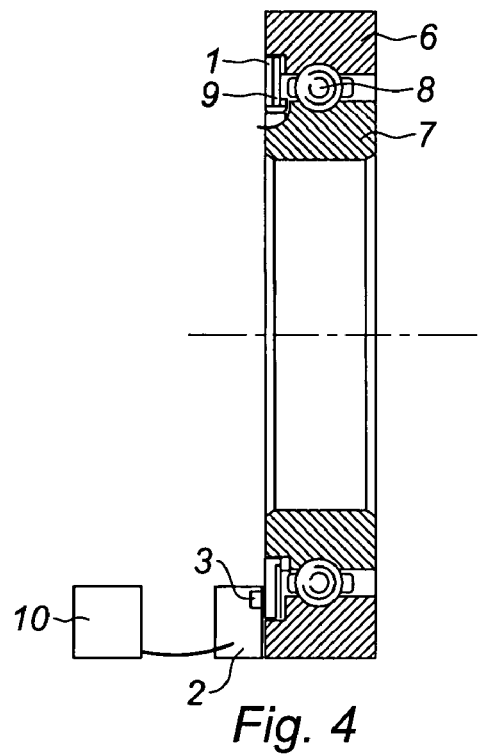
FIG. 4 is a schematic representation of a longitudinal section of an antifriction bearing equipped with a determination system according to the invention.

A bearing equipped with a determination system according to the invention is described herein below in relation to FIG. 4. In the figure, the bearing is in the form of an antifriction bearing, without this limiting the invention to this particular embodiment.

The antifriction bearing includes a stationary outside ring 6, a rotating inside ring 7 and rolling bodies 8 arranged between said rings, in order to enable the relative rotation thereof.

The encoder 1 is interconnected with the rotating ring 7, e.g., by over-moulding on an armature 9 integral with said ring, and the sensor 2 is integral with the stationary ring 6, whereby the sensing elements 3 are arranged at a reading distance from the signal transmitted by the encoder 1.

Furthermore, the antifriction bearing includes a device for determining 10 angular data of the rotating ring 7 in relation to the stationary ring 6, said device using the two pseudo-sinusoidal signals U, V in a known manner. Additionally, and in particular when the amplitudes of the signals U and V are the same, the determination device can include means for interpolating the signals U and V, which are capable of increasing the resolution of the angular data.

Among the advantages in using the signals U and V according to the invention, the following can be cited:
- quasi-insensitivity to the tilt of the sensor 2;
- low sensitivity to the placement tolerances of the sensing elements 3 facing the encoder 1;
- reduced sensitivity to the twist of the sensor 2;
- reduction in output signal errors in the case where an interpolator is used.

What is claimed is:

1. Method for determining two pseudo-sinusoidal signals in quadrature from a pseudo-sinusoidal signal transmitted by an encoder, said method comprising the steps of arranging a sensor including at least four sensing elements which are linearly equally distributed and which are each capable of delivering a signal $S_i$ representative of the signal transmitted by the encoder within reading distance of said encoder, measuring the signals $S_i$, combining said signals $S_i$ using a processor to form the signals $U=(S_1-S_2)-(S_3-S_4)$ and $V=(S_2-S_3)$ with said signals U and V being in quadrature, and determining one of position and speed of the encoder in relation to the sensor using the signals U and V.

2. Determination method of claim 1, further comprising amplifying at least one of the signals U and V so as to equalize their amplitude.

3. Determination method of claim 2, wherein said amplifying step comprises amplifying the signal V by a factor of 2.

4. Determination method as claimed in claim 1, further comprising using four groups of adjacent ones of said sensing elements, and calculating a sum of the signals of each group so as to form the signals $S_i$ corresponding to each of the groups.

* * * * *